US012748444B2

(12) United States Patent
Eberlein

(10) Patent No.: US 12,748,444 B2
(45) Date of Patent: Sep. 29, 2026

(54) VOLTAGE REFERENCE CIRCUIT, INTEGRATED CIRCUIT, AND METHOD FOR GENERATING A REFERENCE VOLTAGE

(71) Applicant: Fraunhofer-Gesellschaft zur Förderung der angewandten Forschung e. V., Munich (DE)

(72) Inventor: Matthias Eberlein, Munich (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 95 days.

(21) Appl. No.: 18/819,677

(22) Filed: Aug. 29, 2024

(65) Prior Publication Data

US 2025/0147536 A1 May 8, 2025

(30) Foreign Application Priority Data

Nov. 3, 2023 (EP) .................................... 23207644

(51) Int. Cl.
*G05F 1/46* (2006.01)
*G05F 3/24* (2006.01)

(52) U.S. Cl.
CPC .............. *G05F 1/468* (2013.01); *G05F 3/245* (2013.01)

(58) Field of Classification Search
CPC ................................. G05F 1/468; G05F 3/245
See application file for complete search history.

(56) References Cited

U.S. PATENT DOCUMENTS 4,249,122 A 2/1981 Widlar
4,570,115 A 2/1986 Misawa et al.
8,816,756 B1 * 8/2014 Eberlein .................. G05F 3/30 327/539

(Continued)

OTHER PUBLICATIONS

Hironori Banba et al., "A CMOS Bandgap Reference Circuit with Sub-1-V Operation", IEEE Journal of Solid-State Circuits, vol. 34, Issue 5, pp. 670-674, May 1999, Total pp. 05.

(Continued)

*Primary Examiner* — Lakaisha Jackson
(74) *Attorney, Agent, or Firm* — Slater Matsil, LLP

(57) ABSTRACT

In an embodiment a voltage reference circuit includes a first asymmetric differential amplifier and a second asymmetric differential amplifier, each having two transistors with different threshold voltages as a differential pair and a resistor string arranged between an output of the first asymmetric differential amplifier and a supply terminal, the resistor string including a first portion, a second portion and a connecting circuit node interposed between them, wherein an output of the second asymmetric differential amplifier is coupled to the connecting circuit node, wherein the first portion of the resistor string is configured to provide a first feedback voltage that is fed back to input terminals of the first asymmetric differential amplifier, and the second portion of the resistor string is configured to provide a second feedback voltage that is fed back to input terminals of the second asymmetric differential amplifier, and wherein the voltage reference circuit is configured to provide a reference voltage at the output of the first or the second asymmetric differential amplifier.

16 Claims, 5 Drawing Sheets

(56) References Cited

U.S. PATENT DOCUMENTS

| | | | | |
|---|---|---|---|---|
| 2007/0241813 | A1* | 10/2007 | Freeke | H03F 3/45973 330/117 |
| 2009/0302931 | A1 | 12/2009 | Moraveji et al. | |
| 2011/0227652 | A1* | 9/2011 | Froehlich | H03G 7/08 330/260 |
| 2014/0266139 | A1 | 9/2014 | Eberlein | |
| 2020/0183434 | A1* | 6/2020 | Hurwitz | G05F 3/30 |
| 2024/0427360 | A1 | 12/2024 | Eberlein | |

OTHER PUBLICATIONS

Christian Jesus B. Fayomi et al., "Sub 1 V CMOS bandgap reference design techniques: a survey", Analog Integrated Circuits and Signal Processing, vol. 62, pp. 141-157, Aug. 18, 2009, Total pp. 17.

Hirobumi Watanabe et al., "CMOS Voltage Reference Based on Gate Work Function Differences in Poly-Si Controlled by Conductivity Type and Impurity Concentration", IEEE Journal of Solid-State Circuits vol. 38, Issue 6, pp. 987-994, Jun. 5, 2003, Total pp. 08.

* cited by examiner

VOLTAGE REFERENCE CIRCUIT, INTEGRATED CIRCUIT, AND METHOD FOR GENERATING A REFERENCE VOLTAGE

CROSS-REFERENCE TO RELATED APPLICATIONS

This application claims priority to European application no. 23207644.8, filed on Nov. 3, 2023, which application is hereby incorporated herein by reference.

TECHNICAL FIELD

The present application relates to a voltage reference circuit, an integrated circuit, and a method for generating a reference voltage.

BACKGROUND

Voltage reference circuits are essential blocks in any integrated circuit, IC. For example, they are required for accurate biasing, sensing, analog-to-digital converters, ADCs, memory element or the like. With aggressive technology scaling it gets challenging to use traditional concepts like bandgap references. For example, either the supply voltage available in-system is too low (e.g. smaller than 0.9V) and hence not sufficient to bias a bipolar junction transistor, BJT, device. Or the process node does not offer a suitable BJT device, or both.

Applications with low supply voltage, in particular below the native bandgap voltage of about 1.25V, may use known current-mode bandgap reference circuits. Such voltage reference circuits may use an open-loop architecture, in which the reference voltage output is outside a feedback loop. In this case, the operation of the voltage reference circuit is not compensating for changes in the output of the voltage reference circuit. Without such adjustments, open-loop voltage reference circuits are highly sensitive to power supply noise, device noise, leakage currents at the output, and circuit element mismatch, making high precision and high performance difficult to achieve.

In addition, such circuits may not or only hardly be able to operate at a supply voltage of under 1.0V (VDD<1.0V), and implementation of such circuits may also depend on the availability of (parasitic) bipolar transistors. Other solution without BJT devices may be sensitive to bias levels and manufacturing spread of MOS devices. They may suffer from low precision or may require extensive calibration effort.

SUMMARY

Embodiments provide an improved voltage reference circuit.

The voltage reference circuit can be incorporated in an integrated circuit. For example, the voltage reference circuit outputs a voltage reference for other circuit components of the integrated circuit. The voltage reference circuit can be implemented in CMOS technology. Further, the voltage reference circuit can be free of bipolar junction transistors, BJT. This means that the voltage reference circuit can be based on metal-oxide semiconductor field-effect transistors, MOS-FETs, for example.

According to at least one embodiment, the voltage reference circuit comprises a first asymmetric differential amplifier and a second asymmetric differential amplifier, each comprising two transistors with different threshold voltages as differential pair.

The asymmetric differential amplifiers may be called amplifiers in the following. The first and the second asymmetric differential amplifiers have asymmetric inputs. The asymmetry is achieved by using two different transistors as differential pair. In particular, the two transistors of the differential pair comprise different threshold voltages. However, the threshold voltages can be correlated. Further, the two transistors of the differential pair can be configured to be operated with different current densities.

For example, to establish different current densities the two transistors of the differential pair can have different width-to-length ratios (W/L), or different currents are provided for the respective transistors. The first and the second asymmetric differential amplifier may be implemented in the same way or differently. This can mean that the same or different transistor devices are used to form the respective amplifiers. Preferably, the first and the second amplifier are implemented differently. Apart from the differential pair, the amplifiers may comprise further circuit components. The differential pair of each amplifier may be part of an input stage of the respective amplifier. The gates of the two transistors may form input terminals of the respective amplifier. The two transistors may be source-coupled. By applying an input voltage between the two gate terminals an output current in the drain terminals is produced. The amplifier may comprise further stages, in particular amplifying stages.

According to at least one embodiment, the voltage reference circuit comprises a resistor string arranged between an output of the first asymmetric differential amplifier and a supply terminal.

The supply terminal can provide a supply voltage, for example VSS. The supply terminal can be called power supply node. The resistor string may comprise a plurality of resistors that are arranged in series. The first end of the resistor string is electrically connected to the output of the first amplifier, while the second end of the resistor string is electrically connected to the supply terminal. The first end of the resistor string can be directly coupled to the output of the first amplifier and the second end can be directly coupled to the supply terminal.

According to at least one embodiment, the resistor string comprises a first portion, a second portion and a connecting circuit node interposed between them. An output of the second asymmetric differential amplifier is coupled to the connecting circuit node.

This can mean that the first portion comprises a first subset of resistors and the second portion comprises a second subset of resistors of the resistor string. The connecting circuit node is arranged between the first portion and the second portion and electrically connects said portions. The output of the second amplifier can be directly coupled to the connecting circuit node.

According to at least one embodiment, the first portion of the resistor string is configured to provide a first feedback voltage that is fed back to input terminals of the first asymmetric differential amplifier. The second portion of the resistor string is configured to provide a second feedback voltage that is fed back to input terminals of the second asymmetric differential amplifier.

This can mean the feedback voltages are generated by respective voltage drops across one or more resistors within the resistor string. The first feedback voltage is generated by a voltage drop across one or more resistors of the first portion. The second feedback voltage is generated by a voltage drop across one or more resistors of the second portion. Thus, the formed feedback loops are separated and not overlapping. Thus, interference is avoided.

According to at least one embodiment, the voltage reference circuit is configured to provide a reference voltage at the output of the first or the second asymmetric differential amplifier.

The reference voltage is provided at an output of the voltage reference circuit. The output of the voltage reference circuit can either be formed by the output of the first asymmetric differential amplifier or by the output of the second asymmetric differential amplifier. The reference voltage can be formed as combination of partial reference voltages across parts of the resistor string.

According to at least one embodiment, a voltage reference circuit comprises a first asymmetric differential amplifier and a second asymmetric differential amplifier, each comprising two transistors with different threshold voltages as differential pair. The voltage reference circuit further comprises a resistor string arranged between an output of the first asymmetric differential amplifier and a supply terminal, the resistor string comprising a first portion, a second portion and a connecting circuit node interposed between them, wherein an output of the second asymmetric differential amplifier is coupled to the connecting circuit node. The first portion of the resistor string is configured to provide a first feedback voltage that is fed back to input terminals of the first asymmetric differential amplifier, and the second portion of the resistor string is configured to provide a second feedback voltage that is fed back to input terminals of the second asymmetric differential amplifier. The voltage reference circuit is configured to provide a reference voltage at the output of the first or the second asymmetric differential amplifier.

The voltage reference circuit described here is based on the following considerations, among others.

The present disclosure realizes a precision reference based on the difference of MOS threshold voltages. The architecture implies differential amplifiers with an artificial input offset. For example, this can be realized by different but correlating MOS device types. A threshold difference of two MOS devices can have a high accuracy during manufacturing, assuming a certain correlation between both thresholds.

Combining two asymmetric differential amplifiers in a resistive feedback configuration specifically allows for flexible compensation of temperature and process spread. In particular, the voltage reference circuit benefits from the cascaded arrangement of the two asymmetric differential amplifiers. Temperature compensation is achieved by generating the reference voltage based on two components with complementary behavior in terms of temperature dependence. These components may be called proportional-to-absolute-temperature- (PTAT-) component and complementary-to-absolute-temperature- (CTAT-)component. Individual threshold voltages of MOS transistors may have a negative temperature coefficient. However, the temperature behavior of the difference in threshold voltage can have a slope in either direction, depending on device materials. It requires a voltage with opposite characteristic to reach temperature compensation. For example, the first asymmetric differential amplifier provides a first partial reference voltage as CTAT-component, while the second asymmetric differential amplifier provides a second partial reference voltage as PTAT-component, or vice versa. It is however also possible that the CTAT- and PTAT-components are provided by both asymmetric differential amplifiers. Therefore, by providing two asymmetric differential amplifiers temperature compensation can be managed very flexible.

The voltage reference circuit can operate at low supply voltages, for example at VDD≤0.7V. It offers a high power supply rejection ratio, PSRR. This is achieved by the closed-looped architecture of the proposed voltage reference circuit.

Further, the voltage reference circuit provides a robust, low-impedance output. In other words, the voltage reference circuit provides a buffered output of the reference voltage, wherein external circuitry can be driven by the reference voltage without additional buffers. This is also achieved by the closed-looped architecture of the proposed voltage reference circuit.

The proposed architecture leads to a reference voltage with high precision. Advantageously, no calibration is required, or a calibration using only a single trim point.

According to at least one embodiment, the first feedback voltage equals an offset voltage of the first asymmetric differential amplifier, and the second feedback voltage equals an offset voltage of the second asymmetric differential amplifier.

As mentioned above, the difference between the transistor threshold voltages of the differential pair of each asymmetric differential amplifier results in a specific offset voltage at the input, required to balance the currents of said input transistors. Due to the feedback arrangement the respective feedback voltage adjusts to said offset voltage.

According to at least one embodiment, the first asymmetric differential amplifier is configured to amplify the first feedback voltage, such that a first partial reference voltage is generated across the first portion of the resistor string.

The first partial reference voltage is generated by a voltage drop across one or more resistors of the first portion of the resistor string. For example, the first partial reference voltage is generated by a voltage drop over all resistors of the first portion of the resistor string. The first partial reference voltage may be different from the first feedback voltage. For example, the first feedback voltage is generated by a voltage drop across only one resistor of the first portion of the resistor string.

According to at least one embodiment, the second asymmetric differential amplifier is configured to amplify the second feedback voltage, such that a second partial reference voltage is generated across the second portion of the resistor string.

The second partial reference voltage is generated by a voltage drop across one or more resistors of the second portion of the resistor string. For example, the second partial reference voltage is generated by a voltage drop across all resistors of the second portion of the resistor string. The second partial reference voltage may be different from the second feedback voltage. For example, the second feedback voltage is generated by a voltage drop across only one resistor of the second portion of the resistor string.

According to at least one embodiment, the reference voltage is provided as sum of the first partial reference voltage and the second partial reference voltage.

The first partial reference voltage and the second partial reference voltage may be equal or may be different. In particular, the first partial reference voltage equals the amplified offset voltage of the first amplifier, wherein the amplification factor is based on the resistor values of the first portion of the resistor string. The second partial reference voltage equals the amplified offset voltage of the second amplifier, wherein the amplification factor is based on the resistor values of the second portion of the resistor string.

For example, the first partial reference voltage provides the PTAT-component of the reference voltage, while the second partial reference voltage provides the CTAT-component of the reference voltage, or vice versa. It is also possible that both partial reference voltages provide own CTAT- and PTAT-components of the reference voltage. Since the reference voltage is provided as sum of the first partial reference voltage and the second partial reference voltage, temperature compensation can be realized flexible and based on available devices of the underlying CMOS process.

According to at least one embodiment, the first portion of the resistor string comprises a first resistor and a second resistor, and the second portion of the resistor string comprises a third resistor and a fourth resistor, wherein the first, the second, the third and the fourth resistor are connected in series to form the resistor string.

A terminal of the first resistor may form the first end of the resistor string that is connected to the output of the first amplifier. A terminal of the fourth resistor may form the opposite second end of the resistor string that is connected to the supply terminal. The second and third resistor may be connected at respective terminals to the connecting circuit node. Thus, the first and the second resistor may define the amplification factor of the offset voltage of the first amplifier. The third and the fourth resistor may define the amplification factor of the offset voltage of the second amplifier. The second resistor and the fourth resistor have a non-zero impedance. The first and third resistor may have a non-zero or zero impedance. Advantageously, the CTAT- and PTAT-component of the reference voltage can be adjusted and/or trimmed and/or calibrated by means of the first, the second, the third and the fourth resistor.

According to at least one embodiment, the first portion of the resistor string is implemented as first voltage divider, and the second portion of the resistor string is implemented as second voltage divider.

This can mean that the first resistor and the second resistor form the first voltage divider, while the third resistor and the fourth resistor form the second voltage divider. For example, only a portion of the first partial reference voltage drops across the second resistor, and only a portion of the second partial reference voltage drops across the fourth resistor. The voltage dividers can be used to set the amplification factor for the respective offset voltages of the amplifiers.

According to at least one embodiment, the first feedback voltage is tapped from a partition of the first voltage divider and the second feedback voltage is tapped from a partition of the second voltage divider.

For example, the voltage drop across the second resistor is used as first feedback voltage. For example, the voltage drop across the fourth resistor is used as second feedback voltage. However, the respective feedback voltages can also be tapped from other partitions of the resistor string, for example within the first, the second, the third and/or the fourth resistor. Thus, the partial reference voltages can be created through alternative arrangements in the resistor string. However, to avoid harmful interference the individual feedback loops may stay separate without overlapping.

According to at least one embodiment, the two transistors of each asymmetric differential amplifier are implemented as metal-oxide semiconductor field-effect transistors that are configured to operate in a sub-threshold region.

Thus, the two transistors are not implemented as bipolar junction transistors, BJT. Therefore, the voltage reference circuit can be provided even for process nodes that do not offer a suitable BJT. In addition, the supply voltage can be low. That the metal-oxide semiconductor field-effect transistors, MOSFETs, are configured to operate in a sub-threshold region can mean that the gate-source voltage is close to threshold voltage. In other words, the transistors operate in weak-inversion mode. The weak-inversion condition can be enforced through device dimensions, e.g. a large width-to-length ratio at low currents.

According to at least one embodiment, an input stage of each asymmetric differential amplifier further comprises a current mirror circuit coupled to the two transistors, wherein the current mirror circuit is configured to provide a first current to a first transistor of the two transistors and a second current to a second transistor of the two transistors.

The differential pair and the current mirror may be part of the input stage of the respective amplifier. For example, the current mirror comprises a third transistor and a fourth transistor. For example, if the differential pair of the respective asymmetric differential amplifier is implemented by n-channel MOSFETs, the transistors of the current mirror can be implemented as p-channel MOSFETs, and vice versa. The transistors of the current mirror may also be implemented as FinFETs, GAAFETs, or any other suitable type of transconductance devices. The current mirror may be configured to act as active load. The first current may be the same or may be different from the second current. Thus, the current density through the first transistor and the second transistor may be equal or may be different.

According to at least one embodiment, in at least one of the asymmetric differential amplifiers a first transistor of the two transistors has the same width-to-length ratio as a second transistor of the two transistors.

The ratio of the width-to-length ratio of the first transistor to the width-to-length ratio of the second transistor is referred to as the "size ratio" of the two transistors and is denoted by N. If the first transistor and the second transistor have identical sizes ($N=1$), or carry the same current densities assuming that the first and the second currents are substantially the same, the resulting offset voltage equals the difference of the threshold voltages of both transistors. This difference of threshold voltages may feature a relatively high accuracy during manufacturing, assuming a certain correlation between both thresholds. Further, in this case the reference voltage may be independent from the thermal voltage and a sub-threshold slope factor, leading to less variation from process spread.

According to at least one embodiment, in at least one of the asymmetric differential amplifiers a first transistor of the two transistors has a different width-to-length ratio than a second transistor of the two transistors.

If the size ratio is selected to be larger or smaller than one, a current density through the first transistor is different than a current density through the second transistor assuming that the first and the second currents are substantially the same. A component with positive (PTAT) or negative (CTAT) coefficient can be added by choosing a size ratio of larger ($N>1$) or smaller than one ($N<1$), respectively. In case of $N>1$ (if the width-to length ratio of the second transistor is larger than that of the first transistor) this yields a lower current density through the second transistor compared to the first transistor. Assuming that the devices are biased in weak inversion (sub-threshold region), the resulting voltage component is proportional to the thermal voltage and features a PTAT-component. By choosing a suitable size ratio ("N-ratio") said PTAT-component can be adjusted in order to obtain a flat and neutral temperature characteristic for the (partial) reference voltage and/or the offset voltage.

According to at least one embodiment, in at least one of the asymmetric differential amplifiers a first transistor of the two transistors is configured to be operated with the same current density as a second transistor of the two transistors. For example, this is achieved by the same width-to-length ratio of the two transistors assuming that the current through both transistors is the same. This results in an offset voltage of the respective amplifier that equals the difference of the threshold voltages of both transistors.

According to at least one embodiment, in at least one of the asymmetric differential amplifiers a first transistor of the two transistors is configured to be operated with a different current density than a second transistor of the two transistors. For example, this is achieved by a different width-to-length ratio of the two transistors, and/or by a different current through the transistors. Thus, the respective amplifier can feature a CTAT- and a PTAT-component of the reference voltage at the same time.

According to at least one embodiment, a temperature coefficient of an offset voltage of the first asymmetric differential amplifier has the opposite sign as a temperature coefficient of an offset voltage of the second asymmetric differential amplifier.

This can mean that the first asymmetric differential amplifier features the CTAT-component, while the second asymmetric differential amplifier features the PTAT-component of the reference voltage, or vice versa, depending on the threshold voltage difference and/or the size ratio of the respective differential pairs. Thus, by using two asymmetric differential amplifiers the temperature independent reference voltage can be generated more flexible.

According to at least one embodiment, the threshold voltages of the two transistors of each of the asymmetric differential amplifiers are correlated.

This can mean that there is a tracking effect among the threshold voltages of the first and the second transistors of the two transistors. By selecting and utilizing specific correlations between the input MOS devices, robustness against process variations can be reached. For example, a correlation is based on the fact, that both transistors are located in the same doped well within the semiconductor substrate. This can mean that the threshold voltages of the two transistors can be correlated, if the transistors are manufactured by the same or similar manufacturing steps.

According to at least one embodiment, the threshold voltages of the two transistors of each of the asymmetric differential amplifiers are tuned by gate work functions.

For example, a strong correlation between the threshold voltages can capitalize on modern technologies, where multiple thresholds are tuned purely by gate work functions. In this case, there is no variation of the threshold voltage difference from channel implantation. The gate work functions may be based on a different doping of the gates of the two transistors, their gate materials and/or their gate thicknesses.

According to at least one embodiment, the offset voltages of the first asymmetric differential amplifier and the second asymmetric differential amplifier are uncorrelated.

This can mean that the threshold voltage differences of the respective amplifiers are uncorrelated. They can at least less correlate than the threshold voltages of the two transistors within each amplifier. For example, this can be achieved by using different input device types. In other words, the threshold voltage differences of the respective amplifiers can be uncorrelated, if the amplifiers are manufactured by manufacturing steps that are independent from each other. The relative spread of the reference voltage reduces if composed from two partial reference voltages with independent variance. Thus, the accuracy can be improved.

According to at least one embodiment, the two transistors of the first asymmetric differential amplifier are implemented as NMOS transistors, and the two transistors of the second asymmetric differential amplifier are implemented as PMOS transistors, or vice versa.

In this way, the two amplifiers can be realized by different device types. Thus, a correlation is weak, and accuracy can be improved. Further, by choosing complementary device types the temperatures coefficients of the threshold voltage differences of the two amplifiers may be opposite. Then, it is feasible to use equal input device sizes (the size ratio equals 1, N=1) and adjust the temperatures response of the reference voltage purely by the resistive voltage dividers. This also leads to less variation from process spread.

Further, an integrated circuit is provided. The integrated circuit comprises the voltage reference circuit as described above. This means that all features disclosed for the voltage reference circuit are also disclosed for integrated circuit and vice versa.

According to at least one embodiment, the integrated circuit further comprises at least one of an analog-to-digital converter circuit, a digital-to-analog converter circuit, a memory circuit, a sensing circuit, and a driving circuit.

Further, a method for generating a reference voltage is provided. The method for generating a reference voltage can preferably be carried out with the voltage reference circuit described above. This means that all features disclosed for the voltage reference circuit are also disclosed for the method for generating a reference voltage and vice versa.

According to at least one embodiment, the method comprises providing a supply voltage to one end of a resistor string.

For example, the supply voltage is VSS. For example, the resistor string comprises a plurality of resistors that are arranged in series.

According to at least one embodiment, the method comprises providing, by a first portion of the resistor string, a first feedback voltage to input terminals of a first asymmetric differential amplifier that comprises two transistors with different threshold voltages as differential pair.

In particular, the first feedback voltage is generated by a voltage drop across a partition of the resistor string, in particular a partition of the first portion of the resistor sting. The first feedback voltage is fed back to the input terminals of the first asymmetric differential amplifier. Since the first asymmetric differential amplifier comprises two transistors with different threshold voltages as differential pair, an offset voltage of the first asymmetric differential amplifier is generated. The first feedback voltage may be equal to said offset voltage.

According to at least one embodiment, the method comprises providing, by a second portion of the resistor string, a second feedback voltage to input terminals of a second asymmetric differential amplifier that comprises two transistors with different threshold voltages as differential pair.

In particular, the second feedback voltage is generated by a voltage drop across a partition of the resistor string, in particular a partition of the second portion of the resistor sting. The second feedback voltage is fed back to the input terminals of the second asymmetric differential amplifier. Since the second asymmetric differential amplifier comprises two transistors with different threshold voltages as differential pair, an offset voltage of the second asymmetric differential amplifier is generated. The second feedback voltage may be equal to said offset voltage.

According to at least one embodiment, the method comprises amplifying, by the first asymmetric differential amplifier, the first feedback voltage to provide a first partial reference voltage across the first portion of the resistor string.

This can mean that the first portion of the resistor string is arranged between an output of the first asymmetric differential amplifier and a connecting circuit node. The connecting circuit node connects the first portion of the resistor string and the second portion of the resistor string.

According to at least one embodiment, the method comprises amplifying, by the second asymmetric differential amplifier, the second feedback voltage to provide a second partial reference voltage across the second portion of the resistor string.

This can mean that the second portion of the resistor string is arranged between an output of the second asymmetric differential amplifier and a terminal for providing the supply voltage. The output of the second asymmetric differential amplifier may be connected to the connecting circuit node.

According to at least one embodiment, the method comprises providing, at an output of the first or the second asymmetric differential amplifier, the reference voltage as sum of the first partial reference voltage and the second partial reference voltage.

According to at least one embodiment, a method for generating a reference voltage comprises providing a supply voltage to one end of a resistor string; providing, by a first portion of the resistor string, a first feedback voltage to input terminals of a first asymmetric differential amplifier that comprises two transistors with different threshold voltages as differential pair; providing, by a second portion of the resistor string, a second feedback voltage to input terminals of a second asymmetric differential amplifier that comprises two transistors with different threshold voltages as differential pair; amplifying, by the first asymmetric differential amplifier, the first feedback voltage to provide a first partial reference voltage across the first portion of the resistor string; amplifying, by the second asymmetric differential amplifier, the second feedback voltage to provide a second partial reference voltage across the second portion of the resistor string; and providing, at an output of the first or the second asymmetric differential amplifier, the reference voltage as sum of the first partial reference voltage and the second partial reference voltage.

By the disclosed method, a precise reference voltage can be provided. A threshold voltage difference of two MOS devices can have a high accuracy during manufacturing, assuming a certain correlation between both thresholds. Further, combining two asymmetric differential amplifiers in a resistive feedback configuration specifically allows for flexible compensation of temperature and process spread. By providing two asymmetric differential amplifiers temperature compensation can be handled very flexible. External circuitry can be driven by the reference voltage without additional buffers. As an additional advantage, no calibration is required, or a calibration using only a single trim point.

According to at least one embodiment, the method further comprises, in a calibration phase, adjusting a value of at least one resistor of the resistor string. In addition or alternatively, the size ratio of at least one transistor within the amplifiers is adjusted.

The calibration phase may be different from an operating phase. The calibration phase may be carried out before normal operation.

BRIEF DESCRIPTION OF THE DRAWINGS

The following description of Figures may further illustrate and explain aspects of the voltage reference circuit, the integrated circuit, and the method for generating a reference voltage. Components and parts of the voltage reference circuit that are functionally identical or have an identical effect are denoted by identical reference symbols. Identical or effectively identical components and parts might be described only with respect to the Figures where they occur first. Their description is not necessarily repeated in successive Figures.

DETAILED DESCRIPTION OF ILLUSTRATIVE EMBODIMENTS

Figure 1:
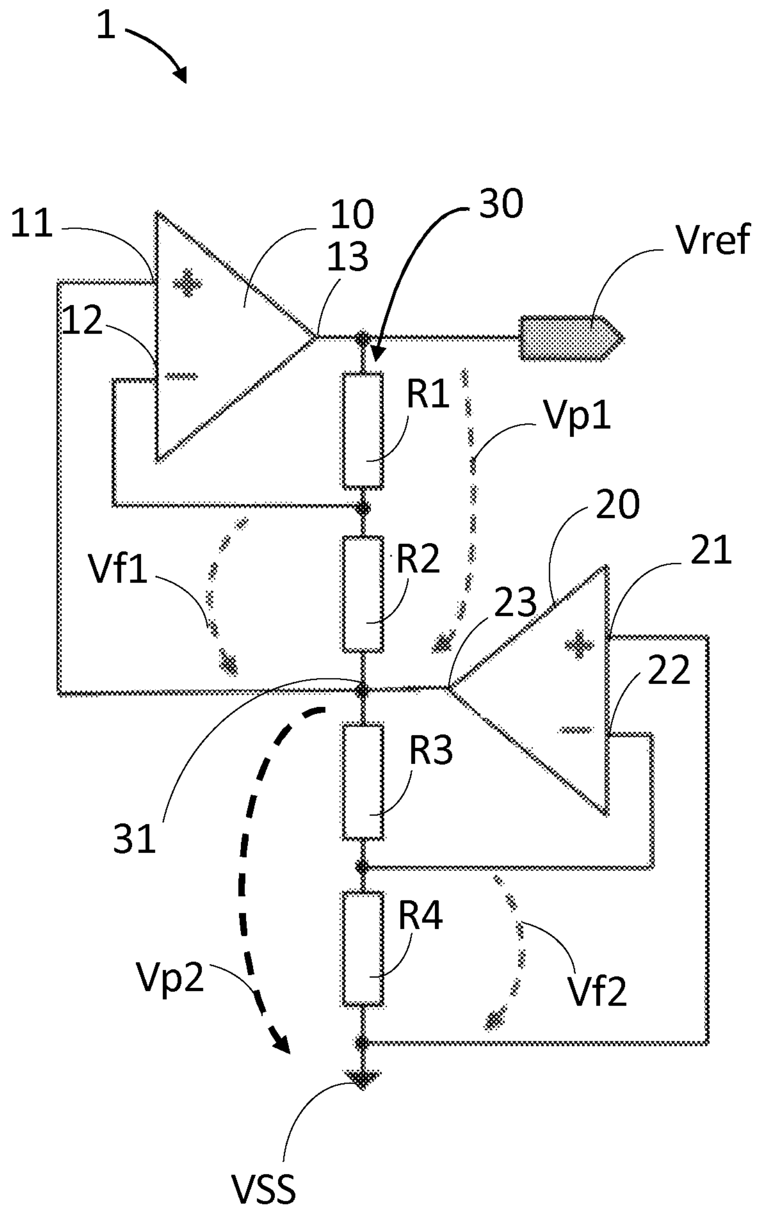
FIG. 1 shows a voltage reference circuit according to an embodiment.

In FIG. 1 a voltage reference circuit 1 according to an exemplary embodiment is shown. The voltage reference circuit 1 comprises a first asymmetric differential amplifier 10 and a second asymmetric differential amplifier 20, each comprising two transistors (not shown in FIG. 1) with different threshold voltages as differential pair. The voltage reference circuit 1 further comprises a resistor string 30 arranged between an output 13 of the first asymmetric differential amplifier 10 and a supply terminal VSS. The resistor string 30 comprising a first portion R1, R2, a second portion R3, R4 and a connecting circuit node 31 interposed between them. An output 23 of the second asymmetric differential amplifier 20 is coupled to the connecting circuit node 31. The first portion R1, R2 of the resistor string 30 is configured to provide a first feedback voltage Vf1 that is fed back to input terminals 11, 12 of the first asymmetric differential amplifier 10 The second portion R3, R4 of the resistor string 30 is configured to provide a second feedback voltage Vf2 that is fed back to input terminals 21, 22 of the second asymmetric differential amplifier 20. The voltage reference circuit 1 is configured to provide a reference voltage Vref at the output 13 of the first asymmetric differential amplifier 10 or at the output 23 of the second asymmetric differential amplifier 20.

The first portion R1, R2 of the resistor string 30 comprises a first resistor R1 and a second resistor R2. The second portion R3, R4 of the resistor string 31 comprises a third resistor R3 and a fourth resistor R4. The first to fourth resistor R1-R4 are arranged in series.

A first terminal of the first resistor is electrically connected to the output 13 of the first asymmetric differential amplifier 10, which is called first amplifier 10 in the following. Here in the following, the term "electrically connected" can mean that there is a direct connection without further electrical components in between. A second terminal of the first resistor R1 is electrically connected to a first terminal of the second resistor R2. A node between the first resistor R1 and the second resistor R2 is connected to a first (inverted) input terminal 12 of the first amplifier 10. A second terminal of the second resistor R2 is electrically connected to a first terminal of the third resistor R3. A node between the second resistor R2 and the third resistor R3 is the connecting circuit node 31. The connecting circuit node 31 is electrically connected to the output 23 of the second asymmetric differential amplifier 20, which is called second amplifier 20 in the following. It is further electrically connected to the second input terminal 11 of the first amplifier 10. A second terminal of the third resistor is electrically connected to a first terminal of the fourth resistor R4. A node in between in connected to a first (inverted) input terminal 22 of the second amplifier 20. A second terminal of the fourth resistor R4 is electrically connected to the supply terminal VSS and to a second input terminal 21 of the second amplifier 20. In other words, the second resistor R2 is coupled between the first resistor R1 and the third resistor R3. The third resistor R3 is coupled between the second resistor R2 and the fourth resistor R4.

However, it should be noted that the resistor string 30 can comprise further resistors apart from the first to fourth resistor R1-R4. It is also possible that at least some of the resistors including the first to fourth resistor R1-R4 have zero impedance.

The first portion R1, R2 of the resistor string 30 is implemented as first voltage divider, and the second portion R3, R4 of the resistor string 30 is implemented as second voltage divider. The first feedback voltage Vf1 is tapped from a partition of the first voltage divider. According to the shown example, the first feedback voltage Vf1 is generated by a voltage drop across the second resistor R2. The second feedback voltage Vf2 is tapped from a partition of the second voltage divider. According to the shown example, the second feedback voltage Vf2 is generated by a voltage drop across the fourth resistor R4. However, it should be noted that the feedback voltages Vf1, Vf2 can also be tapped from other partitions of the resistor string 30, as long as the individual feedback loops stay separated without overlapping. For example, the feedback voltages Vf1, Vf2 are tapped within the first R1, the second R2, the third R3 and/or the fourth resistor R4. Due to the closed feedback loops, the first feedback voltage Vf1 equals an offset voltage Vos of the first asymmetric differential amplifier 10 during operation, and the second feedback voltage Vf2 equals an offset voltage Vos' of the second asymmetric differential amplifier 20 during operation.

The first asymmetric differential amplifier 10 is configured to amplify the first feedback voltage Vf1, such that a first partial reference voltage Vp1 is generated across the first portion R1, R2 of the resistor string 30. As illustrated in the shown example of FIG. 1, the first partial reference voltage Vp1 is generated by a voltage drop over the first resistor R1 and the second resistor R2. The second asymmetric differential amplifier 20 is configured to amplify the second feedback voltage Vf2, such that a second partial reference voltage Vp2 is generated across the second portion R3, R4 of the resistor string 30. As illustrated in the shown example of FIG. 1, the second partial reference voltage Vp2 is generated by a voltage drop over the third resistor R3 and the fourth resistor R4. As mentioned above, however, the partial reference voltages Vp1, Vp2 can be created through alternative arrangements in the resistor string 30.

The reference voltage Vref is provided as sum of the first partial reference voltage Vp1 and the second partial reference voltage Vp2. The reference voltage Vref can be tapped at one of the outputs 13, 23 of the amplifiers 10, 20. In the shown example, the reference voltage Vref is tapped at the output 13 of the first amplifier 10. The reference voltage Vref can be written as $$Vref = Vp1 + Vp2 = Vos\cdot\left(1+\frac{R1}{R2}\right) + Vos'\cdot\left(1+\frac{R3}{R4}\right),$$

wherein the offset voltages Vos, Vos' depend on the threshold voltages differences and the size ratio of the two transistors within the individual amplifiers 10, 20.

Figure 2:
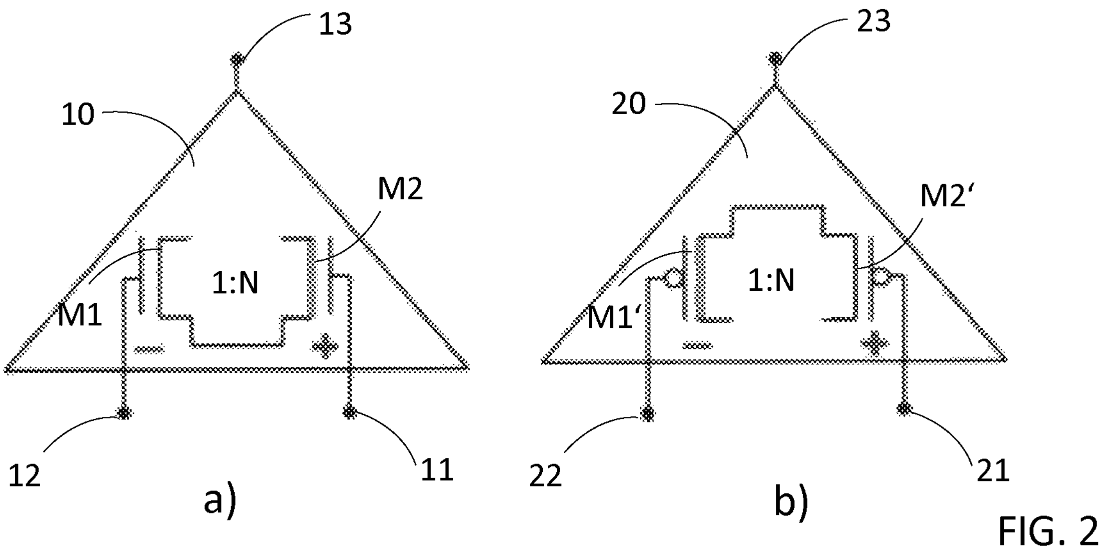
FIGS. 2 to 4 show asymmetric differential amplifiers of a voltage reference circuit according to an embodiment.

With FIGS. 2*a* and 2*b* possible implementations of the first 10 and the second amplifier 20 are shown. It should be noted that the respective amplifiers 10, 20 may comprise further components, in particular amplifying stages, which are not shown in FIGS. 2*a*, 2*b*. The first amplifier 10 of FIG. 2*a* shows two NMOS transistors M1, M2 as differential pair of the first amplifier 10, while FIG. 2*b* shows two PMOS transistors M1', M2' as differential pair of the second amplifier 20. However, it is also possible that the first amplifier 10 comprises two PMOS transistors and/or the second amplifier comprises two NMOS transistors. The disclosure is not limited to the type of transistors in the individual amplifiers 10, 20. However, preferably the two transistors M1, M2 of the first asymmetric differential amplifier 10 are implemented as NMOS transistors, and the two transistors M1', M2' of the second asymmetric differential amplifier 20 are implemented as PMOS transistors, or vice versa. In this case, the offset voltages Vos, Vos' of the first asymmetric differential amplifier 10 and the second asymmetric differential amplifier 20 may be substantially uncorrelated. Further, a temperature coefficient of the offset voltage Vos of the first asymmetric differential amplifier 10 may then have the opposite sign as a temperature coefficient of the offset voltage Vos' of the second asymmetric differential amplifier 20. It can be seen from FIGS. 2*a* and 2*b* that the gate terminals of the respective transistors M1, M2, M1', M2' form respective input terminals 11, 12, 21, 22 of the two amplifiers 10, 20. It should be noted that the two transistors M1, M2 of each amplifier 10, 20 are different in that they have differing threshold voltages Vth1, Vth2. However, the threshold voltages Vth1, Vth2 of the two transistors M1, M2 of each of the asymmetric differential amplifiers 10, 20 can be correlated. For example, the threshold voltages Vth1, Vth2 of the two transistors M1, M2 of each of the asymmetric differential amplifiers 10, 20 are tuned by gate work functions. The current densities through the two transistors M1, M2 can be the same or can be different. The two transistors M1, M2 can further be different in that they have different width-to-length ratios, denoted by W/L. The ratio of the width-to-length ratios of the two transistors M1, M2 is referred to as the "size ratio" of the two transistors and is denoted by 1:N in the Figures. N can be larger or smaller than 1. Thus, the second transistor M2 can have a larger or smaller width-to-length ratio than the first transistor M1. In case of N=1 the width-to-length ratios are equal. Thus, if the currents through both transistors are equal, the current densities are equal, too. A component with positive (PTAT) or negative (CTAT) coefficient can be created by choosing a size ratio of larger (N>1) or smaller than one (N<1), respectively. In case of N>1 (i.e. W/L of the second transistor M2 is larger than that of the first transistor M1) this yields a lower current density through the second transistor M2 compared to the first transistor M1. Assuming that the devices are biased in weak inversion (sub-threshold region), the resulting voltage component can be written as $$Vptat = \eta\cdot VT\cdot\ln(N).$$

Here, the parameter q is the sub-threshold slope factor for the first and the second transistor M1, M2, which is usually close to 1. VT is the thermal voltage, VT=k·T/q, with the Boltzmann constant k, the temperature T, and the magnitude of the electrical charge on the electron q.

Correspondingly, the partial reference voltages become $$Vp1 = \left(1 + \frac{R1}{R2}\right) \cdot [\Delta Vth + \eta \cdot VT \cdot \ln(N)];$$

$$Vp2 = \left(1 + \frac{R3}{R4}\right) \cdot [\Delta Vth' + \eta' \cdot VT \cdot \ln(N')].$$

Thus, the temperature coefficient can be defined very flexible by parameter N (for the first amplifier) and N'(for the second amplifier). Another degree of freedom results from the combination of Vp1 and Vp2 if the respective amplifiers produce diverging threshold voltage differences ΔVth (for the first amplifier 10) and ΔVth'(for the second amplifier 20).

In this case, it is feasible to use equal input device sizes (N=1) and adjust the temperature response of Vref purely by the resistive divider. Then, the reference voltage becomes $$Vref = \Delta Vth \cdot \left(1 + \frac{R1}{R2}\right) + \Delta Vth' \cdot \left(1 + \frac{R3}{R4}\right).$$

This leads to less variation from process spread since Vref depends no longer on the slope parameter q.

Figure 3:
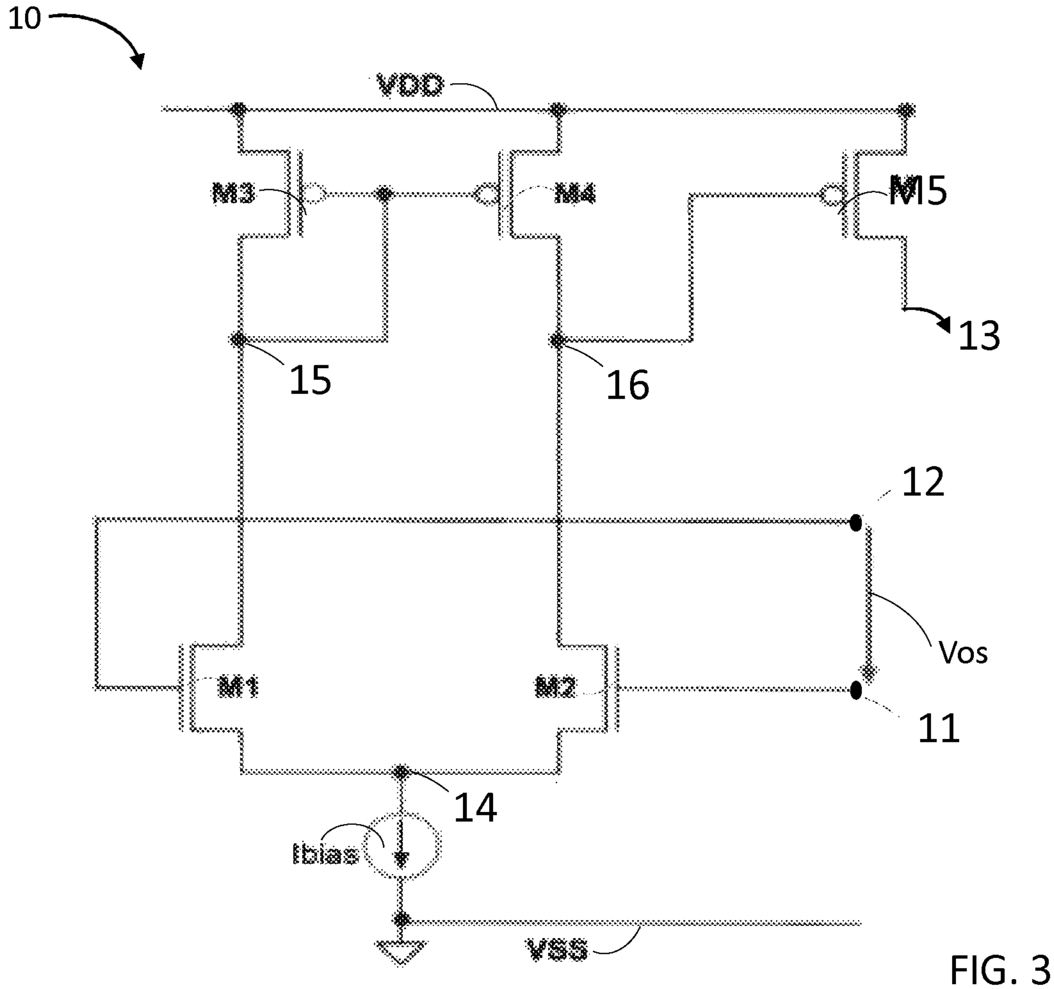

In FIG. 3 one of the amplifiers 10, 20 is shown in more detail. In particular, FIG. 3 shows the input stage of said amplifier. The shown input stage may represent the input stage of the first amplifier 10 having two NMOS transistors M1, M2 as differential pair. The first transistor M1 of the two transistors is coupled between a circuit node 15 and a common node 14, while the second transistor M2 of the two transistors is coupled between a circuit node 16 and the common node 14. Thus, for example, the transistors M1, M2 are source coupled. The common node 14 is connected to a current source Ibias which in turn is connected to a power supply node VSS. The input stage of the shown amplifier 10 further comprises a current mirror circuit M3, M4 coupled to the two transistors M1, M2, wherein the current mirror circuit M3, M4 is configured to provide a first current to the first transistor M1 of the two transistors and a second current to a second transistor M2 of the two transistors. The current mirror M3, M4 may function as active load and comprises a third transistor M3 and fourth transistor M4. In the shown example, the third M3 and fourth transistor M4 are implemented as PMOS transistors. The third transistor M3 is coupled between a further power supply node VDD and the circuit node 15, while the fourth transistor M4 is coupled between the further power supply node VDD and the circuit node 16. Both third and fourth transistors M3, M4 are controlled by a voltage level of circuit node 15. Since the first transistor M1 and the second transistor M2 are implemented differently, an offset voltage Vos is generated between their gates which form the input terminals of the amplifier 10. As shown in FIG. 3, a fifth transistor M5 can be coupled between the further power supply node VDD and an output of the input stage which may lead to further amplifying stages and to the output 13 of the amplifier 10. The fifth transistor M5 is controlled by a voltage level of circuit node 16. Thus, the fifth transistor M5 provides an output of the input stage of the amplifier 10.

Figure 4:
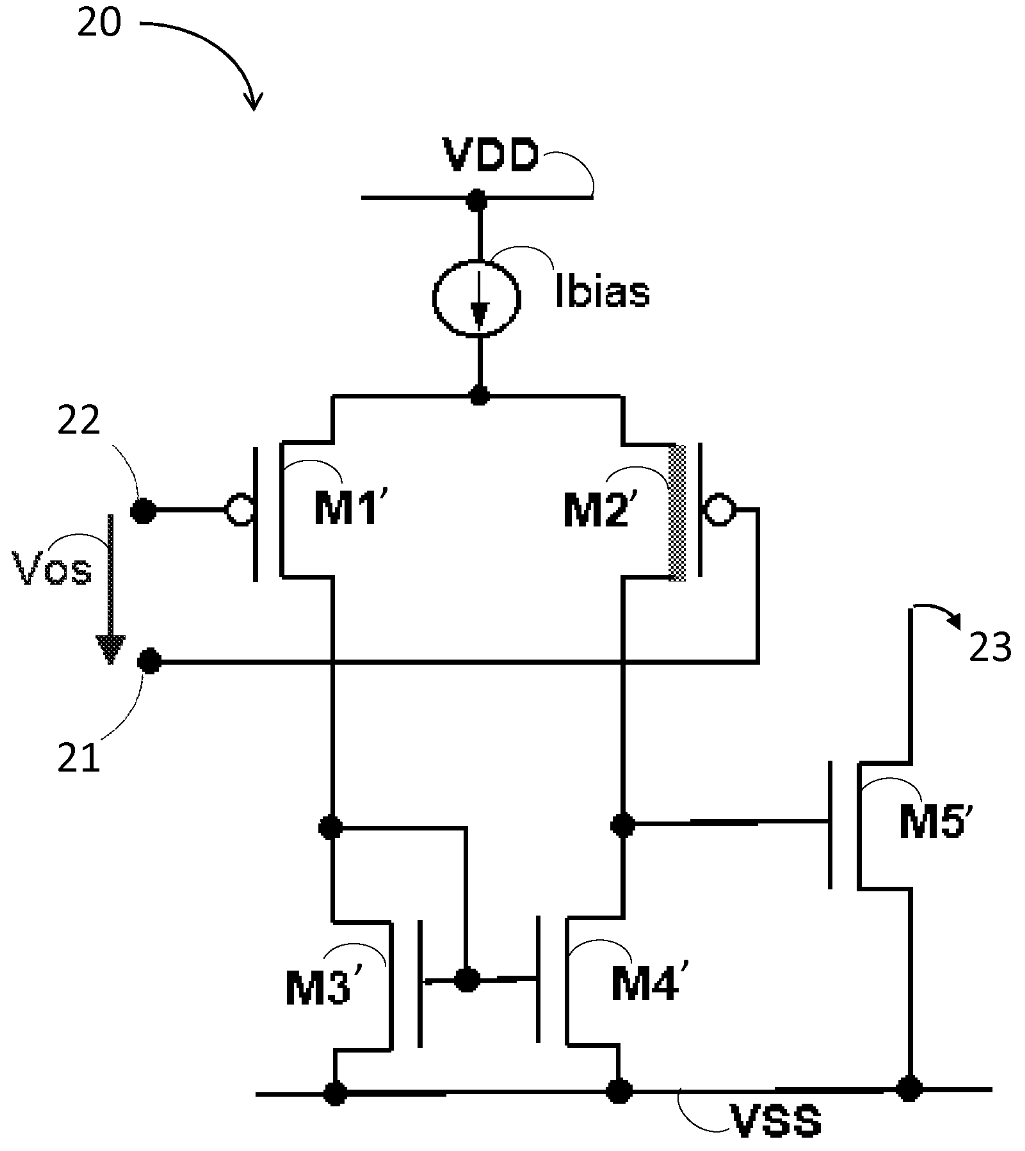

A skilled person will understand how to implement a corresponding input stage of an amplifier 10, 20 that uses PMOS devices as differential pair. Such an implementation can be similar to that shown in FIG. 4 and may use NMOS devices for the current mirror. Thus, FIG. 4 is not explained in detail in the following. Instead, reference is made to FIG. 3 explained above.

Figure 5:
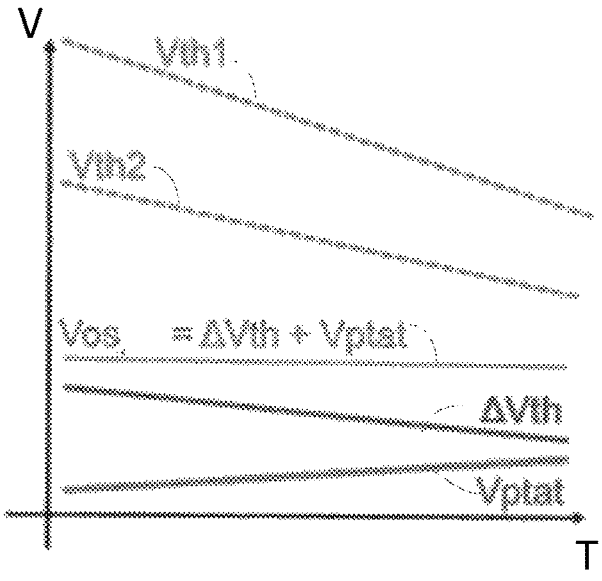
FIG. 5 shows various voltage characteristics in dependence on temperature.

In FIG. 5 various voltage characteristics in dependence on temperature are shown. The threshold voltages Vth1, Vth2 of individual transistors are decreasing with temperature. Thus, they usually have a negative temperature coefficient. However, the temperature behavior of the threshold voltage difference ΔVth can have a weak slope in either direction, depending on device materials. In the shown example, the threshold voltage difference ΔVth has a weak negative slope with increasing temperature. It requires a voltage Vptat with opposite characteristic to reach temperature compensation for the offset voltage Vos. As mentioned above, the voltage component Vptat can originate from a suitable size ratio between the two transistors. It is also possible to achieve a temperature compensated reference voltage Vref from the combination of Vp1 and Vp2 if the respective amplifiers produce diverging threshold voltage differences ΔVth and ΔVth'. In this case, the size ratio can be 1 (N=1).

Figure 6:
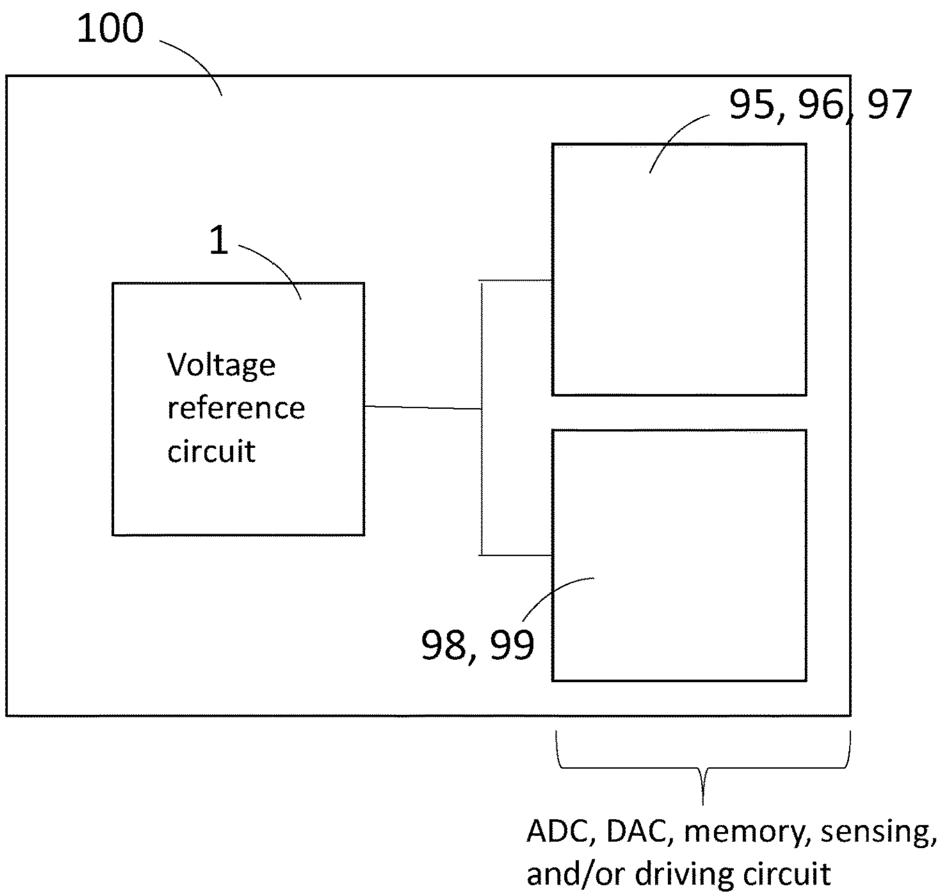
FIG. 6 shows an integrated circuit according to an embodiment.

In FIG. 6 an exemplary integrated circuit 100 is shown. The integrated circuit 100 comprises the voltage reference circuit 1 according to one of the above-described embodiments. The integrated circuit may further comprise at least one of an analog-to-digital converter circuit 95, a digital-to-analog converter circuit 96, a memory circuit 97, a sensing circuit 98, and a driving circuit 99. In the shown example the integrated circuit 100 comprises two of such components. However, the integrated circuit 100 can also comprise only one or more additional circuit components. The additional circuit components 95, 99 are electrically connected to the voltage reference circuit 1. This can mean that the voltage reference circuit 1 provides a reference voltage Vref to each of the additional circuit components 95-99.

Figure 7:
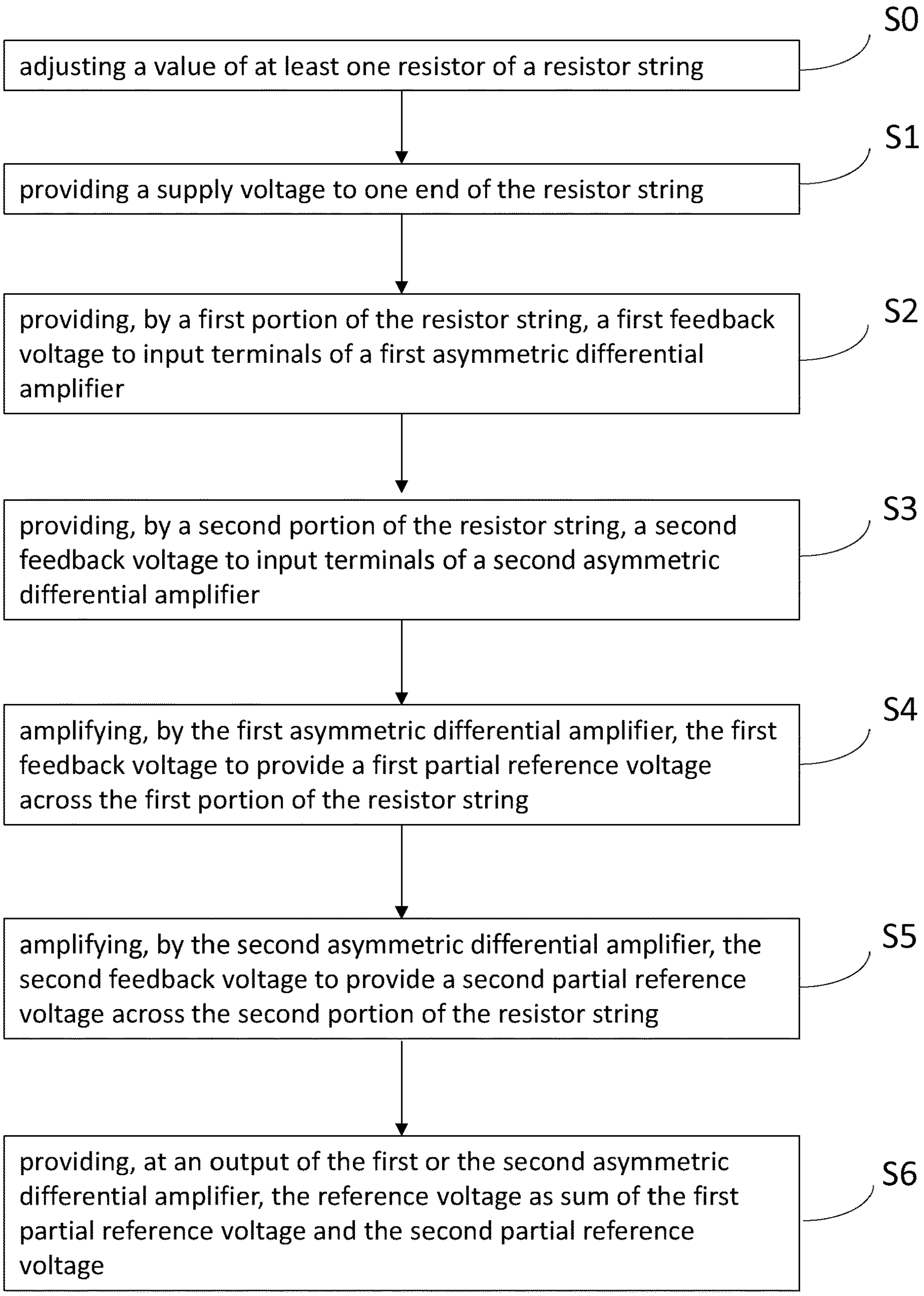
FIG. 7 schematically shows a method for generating a reference voltage.

With FIG. 7 a method for generating a reference voltage Vref is shown schematically. The method comprises the following steps that are not necessarily carried out in this order but can be carried out in this order.

In an optional step S0, a value of at least one resistor of a resistor string 30 is adjusted in a calibration phase.

In a first step S1, a supply voltage VSS is provided to one end of the resistor string 30.

In a second step S2, a first feedback voltage Vf1 is provided to input terminals 11, 12 of a first asymmetric differential amplifier 10 that comprises two transistors M1, M2 with different threshold voltages Vth1, Vth2 as differential pair, wherein the first feedback voltage Vf1 is provided by a first portion R1, R2 of the resistor string 30.

In a third step S3, a second feedback voltage Vf2 is provided to input terminals 21, 22 of a second asymmetric differential amplifier 20 that comprises two transistors M1', M2' with different threshold voltages Vth1', Vth2' as differential pair, wherein the second feedback voltage Vf2 is provided by a second portion R3, R4 of the resistor string 30.

In a fourth step S4, the first feedback voltage Vf1 is amplified by the first asymmetric differential amplifier 10, to provide a first partial reference voltage Vp1 across the first portion R1, R2 of the resistor string 30.

In a fifth step S5, the second feedback voltage Vf2 is amplified by the second asymmetric differential amplifier 20, to provide a second partial reference voltage Vp2 across the second portion R3, R4 of the resistor string 30.

In a sixth step S6, the reference voltage Vref is provided as sum of the first partial reference voltage Vp1 and the second partial reference voltage Vp2. The reference voltage is provided at an output 13, 23 of the first 10 or the second asymmetric differential amplifier 20.

The embodiments of the voltage reference circuit 1 and the method, the integrated circuit 100 and the method for generating a reference voltage Vref disclosed herein have been discussed for the purpose of familiarizing the reader with novel aspects of the idea. Although preferred embodiments have been shown and described, many changes, modifications, equivalents and substitutions of the disclosed concepts may be made by one having skill in the art without unnecessarily departing from the scope of the claims.

It will be appreciated that the disclosure is not limited to the disclosed embodiments and to what has been particularly shown and described hereinabove. Rather, features recited in separate dependent claims or in the description may advantageously be combined. Furthermore, the scope of the disclosure includes those variations and modifications, which will be apparent to those skilled in the art and fall within the scope of the appended claims.

The term "comprising", insofar it was used in the claims or in the description, does not exclude other elements or steps of a corresponding feature or procedure. In case that the terms "a" or "an" were used in conjunction with features, they do not exclude a plurality of such features.

What is claimed is:

1. A voltage reference circuit comprising a first asymmetric differential amplifier and a second asymmetric differential amplifier, each comprising two transistors with different threshold voltages as a differential pair; and a resistor string arranged between an output of the first asymmetric differential amplifier and a supply terminal, the resistor string comprising a first portion, a second portion and a connecting circuit node interposed between them, wherein an output of the second asymmetric differential amplifier is coupled to the connecting circuit node, wherein the first portion of the resistor string is configured to provide a first feedback voltage that is fed back to input terminals of the first asymmetric differential amplifier, and the second portion of the resistor string is configured to provide a second feedback voltage that is fed back to input terminals of the second asymmetric differential amplifier, and wherein the voltage reference circuit is configured to provide a reference voltage at the output of the first or the second asymmetric differential amplifier.

2. The voltage reference circuit according to claim 1, wherein the first feedback voltage equals an offset voltage of the first asymmetric differential amplifier, and wherein the second feedback voltage equals an offset voltage of the second asymmetric differential amplifier.

3. The voltage reference circuit according to claim 1, wherein the first asymmetric differential amplifier is configured to amplify the first feedback voltage such that a first partial reference voltage is generated across the first portion of the resistor string, wherein the second asymmetric differential amplifier is configured to amplify the second feedback voltage such that a second partial reference voltage is generated across the second portion of the resistor string, and wherein the reference voltage is provided as a sum of the first partial reference voltage and the second partial reference voltage.

4. The voltage reference circuit according to claim 1, wherein the first portion of the resistor string comprises a first resistor and a second resistor forming a first voltage divider, wherein the second portion of the resistor string comprises a third resistor and a fourth resistor forming a second voltage divider, and wherein the first resistor, the second resistor, the third resistor and the fourth resistor are connected in series to form the resistor string.

5. The voltage reference circuit according to claim 4, wherein the first feedback voltage is tapped from a partition of the first voltage divider and the second feedback voltage is tapped from a partition of the second voltage divider.

6. The voltage reference circuit according to claim 1, wherein the threshold voltages of the two transistors of each of the asymmetric differential amplifiers are tunable by gate work functions.

7. The voltage reference circuit according to claim 1, wherein the two transistors of each asymmetric differential amplifier are metal-oxide semiconductor field-effect transistors that are configured to operate in a sub-threshold region.

8. The voltage reference circuit according to claim 1, wherein, in at least one of the asymmetric differential amplifiers, a first transistor of the two transistors is configured to be operated with the same current density as a second transistor of the two transistors.

9. The voltage reference circuit according to claim 1, wherein, in at least one of the asymmetric differential amplifiers, a first transistor of the two transistors is configured to be operated with a different current density than a second transistor of the two transistors.

10. The voltage reference circuit according to claim 1, wherein a temperature coefficient of an offset voltage of the first asymmetric differential amplifier has an opposite sign to a temperature coefficient of an offset voltage of the second asymmetric differential amplifier.

11. The voltage reference circuit according to claim 1, wherein the threshold voltages of the two transistors of each of the asymmetric differential amplifiers are correlated.

12. The voltage reference circuit according to claim 1, wherein offset voltages of the first asymmetric differential amplifier and the second asymmetric differential amplifier are uncorrelated.

13. The voltage reference circuit according to claim 1, wherein the two transistors of the first asymmetric differential amplifier are NMOS transistors, and wherein the two transistors of the second asymmetric differential amplifier are PMOS transistors, or vice versa.

14. An integrated circuit comprising:

the voltage reference circuit according to claim 1; and at least one of an analog-to-digital converter circuit, a digital-to-analog converter circuit, a memory circuit, a sensing circuit, or a driving circuit.

15. A method for generating a reference voltage, the method comprising:

providing a supply voltage to one end of a resistor string;

providing, by a first portion of the resistor string, a first feedback voltage to input terminals of a first asymmetric differential amplifier comprising two transistors with different threshold voltages as a differential pair;

providing, by a second portion of the resistor string, a second feedback voltage to input terminals of a second asymmetric differential amplifier comprising two transistors with different threshold voltages as a differential pair;

amplifying, by the first asymmetric differential amplifier, the first feedback voltage to provide a first partial reference voltage across the first portion of the resistor string;

amplifying, by the second asymmetric differential amplifier, the second feedback voltage to provide a second partial reference voltage across the second portion of the resistor string; and providing, at an output of the first or the second asymmetric differential amplifier, the reference voltage as a sum of the first partial reference voltage and the second partial reference voltage.

16. A voltage reference circuit comprising:

a first asymmetric differential amplifier and a second asymmetric differential amplifier, each comprising two transistors with different threshold voltages as a differential pair; and a resistor string arranged between an output of the first asymmetric differential amplifier and a supply terminal, the resistor string comprising a first portion, a second portion and a connecting circuit node interposed between them, wherein an output of the second asymmetric differential amplifier is coupled to the connecting circuit node, wherein the first portion of the resistor string is configured to provide a first feedback voltage that is fed back to input terminals of the first asymmetric differential amplifier, and the second portion of the resistor string is configured to provide a second feedback voltage that is fed back to input terminals of the second asymmetric differential amplifier, wherein the voltage reference circuit is configured to provide a reference voltage at the output of the first asymmetric differential amplifier or the second asymmetric differential amplifier, and wherein a temperature coefficient of an offset voltage of the first asymmetric differential amplifier has an opposite sign to a temperature coefficient of an offset voltage of the second asymmetric differential amplifier and/or wherein offset voltages of the first asymmetric differential amplifier and the second asymmetric differential amplifier are uncorrelated.

* * * * *